Oct. 7, 1969   A. F. DEMING   3,471,707
VOLTAGE COMPENSATION CIRCUIT FOR LIGHT
AND HEAVY LOAD CURRENTS
Filed March 31, 1966   2 Sheets-Sheet 1

INVENTOR.
ANDREW F. DEMING
BY Woodling, Krost,
Granger and Rust
ATTORNEYS

Oct. 7, 1969

A. F. DEMING 3,471,707

VOLTAGE COMPENSATION CIRCUIT FOR LIGHT
AND HEAVY LOAD CURRENTS

Filed March 31, 1966

INVENTOR.
ANDREW F. DEMING
BY Woodling, Krost,
Granger and Rust
ATTORNEYS

United States Patent Office 3,471,707
Patented Oct. 7, 1969

3,471,707
VOLTAGE COMPENSATION CIRCUIT FOR LIGHT AND HEAVY LOAD CURRENTS
Andrew F. Deming, Alliance, Ohio, assignor to Consolidated Electronics Industries Corporation, a corporation of Delaware
Filed Mar. 31, 1966, Ser. No. 539,031
Int. Cl. H02j 3/14
U.S. Cl. 307—41                            27 Claims

ABSTRACT OF THE DISCLOSURE

Several circuits are shown for maintaining proper input voltage to a voltage sensitive first load supplied from a transformer. When a heavier second load is energized, this normally drops the voltage on the first load and a circuit element such as a voltage boost winding on a relay or a secondary winding on the transformer or a dropping resistor develops a third voltage which is vectorially added to the first voltage to supply the input voltage to the first load. When the heavier second load also is being supplied by the transformer this circuit element has a fourth voltage the reacross vectorially added to the second voltage of the transformer secondary to again supply substantially the same input voltage to the first load.

---

Figure 1:
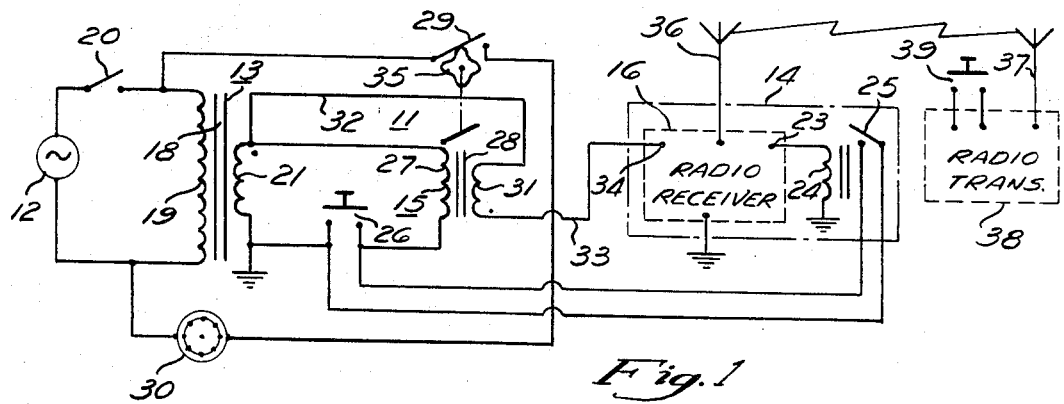

The invention relates in general to a voltage compensation circuit and more particularly to a circuit wherein two different loads are supplied and when a second load is supplied as well as a first load a compensation voltage is applied to the first load to maintain the input voltage on the first load more merely constant.

In many electrical loads, especially in low power circuits, transformers are used to supply plural loads. When a first load is supplied from the transformer, a first voltage will be applied to the input to this first load. Now when a second load is also supplied from the same transformer, the added IR drop through the secondary winding of the transformer decreases the terminal voltage of the secondary winding. This lowers the voltage to both the first and second loads. In many cases this lowered voltage is objectionable and one common method to eliminate this lowered voltage was to supply the two loads from separate transformers. This, however, is costly involving the expense of a second transformer. In other cases a first load may be continuously or substantially continuously supplied with energy from the transformer. This may be a low wattage load and it would be desirable to use the same transformer to supply an intermittent duty second load of considerably larger wattage requirements. The transformer would be capable of supplying this intermittent duty larger load requirement, as far as overheating is concerned, but the transformer secondary winding would have a considerable IR drop which would be objectionable on the first load. Another alternative taught by the prior art was to use regulators such as Zener diodes in the first load in order to maintain substantially constant voltage. However, using the Zener diodes and a resistor and a capacitor in the first load was also expensive, nearly as expensive as a second transformer.

The present invention finds particular use in a circuit for use with a garage door operator control. In such control circuits a transmitter in the automobile may be momentarily keyed for perhaps one or two seconds to send out a signal. When this signal is received by a garage door operator receiver of the proper frequency and coding, then this radio receiver has an output signal to energize a relay. Closing of the relay energizes an electric motor to cause the garage door to open or close. When the radio receiver and the relay were both energized from a single stepdown transformer, trouble has previously been encountered. The constantly energized radio receiver generally places a relatively small load on the transformer and the intermittently energized relay places a considerably larger load on this transformer. The relay is of course voltage sensitive and if the voltage drops too low the relay will drop out. However this may be compensated for by designing the relay winding to operate on the lowered voltage. The radio receiver is also voltage sensitive and if the voltage drops too low the radio will cease to have an output voltage to the relay. This is where the trouble lies because of the interdependence between the output from the radio and the energization of the relay which is a second load on the transformer. Assume, for example, that the door operator transmitter is keyed by the driver of the automobile at just the threshold of sensitivity of the radio receiver circuit. At this point the radio receiver just barely picks up sufficient signal to cause the relay to be energized. This causes the voltage of the transformer secondary to decrease because of the heavy load of the relay and as a result the radio receiver, which is just barely operating, then ceases to have an output voltage and the relay drops out. Therefore the present invention introduces a stabilizing circuit which is necessary because of the synchronization or interdependence between first and second loads, which are both energized from the transformer secondary, and the energization of the second load is dependent upon energization of and an output from the first load.

Accordingly an object of the invention is to obviate the above-mentioned disadvantages.

Another object of the invention is to provide an electrical circuit which supplies first and second loads and wherein the voltage supplied to the first load is compensated at the time of energization of the second load.

Another object of the invention is to provide an electrical circuit supplied by a single transformer with voltage compensating means to a first load at the time a second load is energized.

Another object of the invention is to provide a voltage regulating circuit from a single transformer supplying a small first load and a large second load intermittently energized wherein a voltage is developed across a circuit element and this voltage is algebraically or vectorially added to the voltage of a secondary winding on the transformer in order to compensate for a reduced terminal voltage of the secondary winding upon energization of the second load.

Another object of the invention is to provide a voltage compensating circuit supplying first and second loads wherein the first and second loads are interdependent and energization of the second load is dependent upon an energization of and an output from a first load, with compensation of the input voltage to the first load upon energization of the second load so that the first load is maintained energized and in an operative condition.

Another object of the invention is to provide a compensating voltage across an inductive winding wound on a core which is magnetizable and which receives energy from the primary winding of a transformer with the voltage across the inductive winding being vectorially added to the voltage of the secondary winding on the transformer to supply a compensating voltage to a first load at the time a second load is energized from the same transformer.

The invention may be incorporated in a circuit for supplying an input voltage to a first load, said circuit comprising, in combination, a transformer, primary winding means on said transformer energizable from a voltage source, secondary winding means on said transformer developing a first voltage under light load and a lower second voltage under a heavier load, circuit element means, switch means, a second load, means connecting said secondary winding means through said switch means to control energization of said second load, means receiving power from said transformer and developing a third voltage across said circuit element means when said second load is substantially deenergized and developing a fourth voltage across said circuit element means when said second load is substantially energized, and means connecting said secondary winding means through said circuit element means to energize the first load in accordance with the vector sum of the voltages thereacross.

Other objects and a fuller understanding of the invention may be had by referring to the folowing description and claims, taken in conjunction with the accompanying drawings, in which:

FIGURE 1 is a schematic diagram of a circuit embodying the invention, and:

FIGURES 2, 3, 4, 5, and 6 are modified circuits embodying the invention.

The FIGURE 1 shows a preferred embodiment of the invention including a circuit 11 energizable from a voltage source 12 through a transformer 13 to supply energy to a first load 14 and a second load 15. In this preferred embodiment the first load 14 has considerably smaller wattage or amperage requirement than the second load 15. Also the first load 14 is continuously or substantially continuously energized and the second load is only intermittently energized. Accordingly, it is desired to energize both loads from the single transformer 13 rather than to use two different transformers. The first load 14 is illustrated as including a radio receiver 16 and with a transistorized circuit this may be of low wattage requirements, for example, 10 or 20 milliamperes. The second load 15 is illustrated in this preferred embodiment as being a power relay and for example this may require 3 amperes. However, because this second load or power relay 15 is only intermittently energized, the transformer 13 will have sufficient wattage capacity to supply this intermittent duty requirement.

The transformer 13 has a core 18 which is non-saturable in normal use including supplying the requirements of the second load 15. A primary winding 19 is provided on the core 18 and is energized from the voltage source 12 through a main switch 20. This source 12 may be any convenient source, such as commercially available voltage and frequency. A secondary winding 21 is also wound on the core 18 and in this preferred embodiment is a low voltage winding, for example, 24 volts.

The radio receiver 16 has an output at terminal 23 to a pilot relay 24. This pilot relay controls normally open contacts 25. These contacts 25 are connected in parallel with a pushbutton switch 26. The pushbutton switch 26 is connected in series to the energizing winding 27 of the power relay 15 across the secondary winding 21. The power relay 15 has a core 28 to attract a movable armature and intermittently close and open normally open contacts 29 by a cam 35. These contacts control a still further load circuit illustrated as an induction motor 30 energized from the voltage source 12 through the switch 20 and through the relay contacts 29.

The core 28 of the power relay 15 also has wound thereon a secondary winding 31. Conductors 32 and 33 connect the secondary winding 21 in series with the secondary winding 31 to an input terminal 34 on the first load 14. The radio receiver 16 may have a receiving antenna 36 adapted to receive a signal from the transmiting antenna 37 of a radio transmitter 38. This transmitter may be controlled or keyed by a pushbutton switch 39 to transmit a signal.

OPERATION

The circuit 11 of FIGURE 1 may have several uses of which one is with a radio controlled garage door operator. The induction motor 30 may be connected to raise and lower the garage door as controlled by the pushbuttom switch 26 which may be located in the garage, for example, and also controlled by the pushbutton switch 39 which may be located in the automobile, for example. The driver of the automobile, to open the garage door, would depress the pushbutton switch 39 so that the transmitter 38 would emit a signal. The radio receiver 16 may be substantially continuously energized to be responsive to this emitted signal. Upon receiving such signal, the radio receiver 16 develops an output at the output terminal 23 to energize the pilot relay 24. This closes normally open contacts 25 to energize the power relay 15. This closes the normally open contacts 29 thereof to energize the door operator motor 30.

The radio receiver might require 10 or 20 milliamperes of current in a transistorized circuit, for example, at a 24 volt input and the power relay 15 might require 3 amperes at this same 24 volt input. Because the power relay 15 actuates the contacts 29 through a multiple position cam 35, once the power relay 15 has been energized, this closes the contacts 29 and thereafter the relay energizing winding 27 may be immediately deenergized. This places this power relay again in control of the circuit because the door may be stopped at any point in its travel merely by closing the pushbutton switch 26 or 39. Such closing will again energize the power relay 15 to open the contacts 29. It is this short energization of perhaps a halfsecond of the energizing winding 27 that permits the intermittent duty rating on the small transformer 18 to supply the smaller first load 14 and the intermittent heavy duty relay load 15. However, with the heavy second load 15 applied to the secondary winding 21, the IR drop or leakage reactance in this secondary winding will greatly reduce the terminal voltage of this secondary winding 21. As an example, the voltage across this winding might drop from 24 volts to 19 volts. The power relay may be readily designed to satisfactorily pull in at this reduced voltage of 19 volts, but the radio receiver 16 has been found to be voltage sensitive.

This receiver 16 may be designed to operate through the transformer on the normal line voltage plus or minus 10 percent. For example if the input voltage from the voltage source 12 is normally 115 volts, the radio receiver may be designed to satisfactorily operate even though the input voltage may rise to 125 volts or drop to 105 volts on the primary 19. However, dropping from 24 volt input to 19 volt input is a drop in excess of 20 percent and many receiver circuits are rendered inoperative at this lower input voltage. If the radio receiver had this low an input voltage it might not produce an output voltage to the pilot relay 24 in which case the pilot relay would open and the power relay would also be deenergized. This is especially true if the automobile is at a distance from the garage and the radio receiver is operating only on the threshhold of sensitivity. This would relieve the secondary 21 from its heavy load and raise the voltage thereon and again make the radio receiver operative. This could all happen within one-tenth of a second or less and the transmitted radio signal usually lasts for about one second or more. Thus the radio receiver would again have an output to again energize the pilot relay 24 and this would energize the power relay 15 to open contacts 29 and stop the motor 30. This cycle would continue simulating contact chatter, with the relays 24 and 15 intermittently energized at a fast rate and the motor intermittently energized. This is a definitely unsatisfactory operating condition and accordingly the present invention eliminates this simulated chatter or intermittent energization of the relays.

The present circuit maintains substantially constant input voltage to the input terminal 34 in the first load 14. This is accomplished by the secondary winding 31 on the relay 15. When this relay is energized, whether only momentarily or for a longer period of time, the energizing winding 27 develops an MMF in the core 28 and develops by transformer action a voltage on the secondary winding 31. For example, the turns ratio may be such as to develop five volts across this secondary winding 31. As shown by the dots indicating polarity, the secondaries 21 and 31 are connected in voltage additive relationship to the input of the radio receiver 16. Accordingly when the relay 15 is energized, and the large load thereof drops the voltage on secondary 21 from 24 to 19 volts, for example, a five volt boost is given by relay secondary winding 31 to the radio receiver 16. This maintains a substantially constant input voltage thereto, in this example 24 volts. As soon as the relay 15 is deenergized the voltage on secondary winding 21 will increase but the voltage on secondary winding 31 will decrease substantially to zero and this will again supply 24 volts to the receiver 16.

When the secondary winding 21 is energizing only the first load 14 it has a first voltage thereacross, for example, 24 volts. When this secondary winding 21 is energizing both the first and second loads 14 and 15 then secondary winding 21 has a lower second voltage thereacross, for example, 19 volts. The relay secondary winding 31 may be considered a circuit element energized from the primary winding 19. When only the first load 14 is energized the circuit element or secondary winding 31 has a third voltage thereacross, namely zero voltage. When both the first and second loads 14 and 15 are energized this secondary winding 15 has a fourth voltage thereacross, for example, 5 volts. Thus the algebraic or vector sum of the first and third voltages substantially equals the sum of the second and fourth voltages. In the above example, 24 plus 0 equals 19 plus 5.

Figure 2:
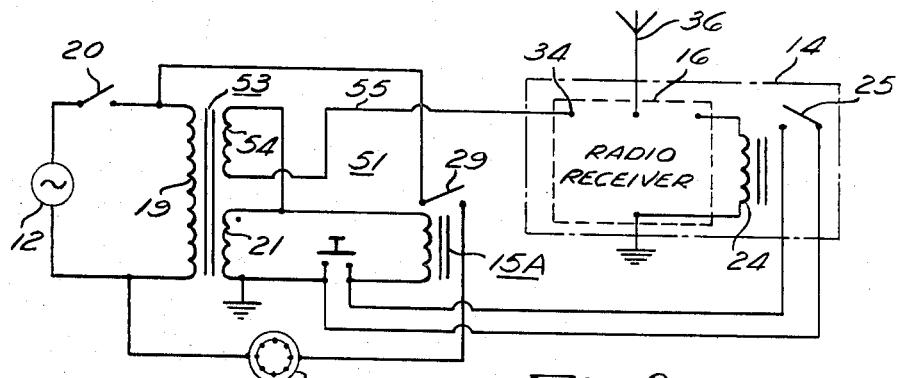

FIGURE 2 shows a modification of the invention in a circuit 51. This circuit includes a transformer 53 having the primary winding 19 and a first secondary winding 21. It also has a second secondary winding 54. This secondary winding 54, for example, might be a 48 volt secondary when the secondary 21 is 24 volts. The windings 21 and 54 are connected in series opposing by a conductor 55 to the input of the radio receiver 16. Accordingly when part of the first load 14. The pilot relay 24 is controlled by the output from the radio receiver 16 and a power relay 15A may in turn be controlled by contacts 25 of the pilot relay 24. Power relay contacts 29 control another load shown as an induction motor 30.

OPERATION

The circuit 51 of FIGURE 2 may operate in a manner similar to that of FIGURE 1 and when a signal is received on the receiving antenna 36 the pilot relay 24 will be energized to energize the power relay 15A. This places a heavy load on the secondary winding 21 to drop the voltage thereof. Previously the radio receiver 16 had been operating on, for example, 48 minus 24 or 24 volts. Now the secondary winding 21 may drop to 19 volts, for example. At the same time the secondary winding 54 will drop from 48 to 43 volts. Accordingly the radio receiver will now receive 43 minus 19 or 24 volts.

In the operation of a transformer the watts loss in the secondary 21 will equal the watts loss in the primary 19, upon energization of a load, for example, the second load 15A. As an example, if the primary 19 is energized at nominally 120 volts and secondary winding 21 is nominally 24 volts, then this is a 5:1 step-down ratio with half of the watts loss in the primary and half in the secondary. This means that half of the five volts loss is caused by the secondary IR drop found in the secondary winding. The one-half of the five volts loss caused by the primary IR drop is 12½ volts IR drop in the primary, considering the 5:1 transformation ratio. Neglecting leakage, the primary voltage is then 120 minus 12½ or 107½ volts. This divided by the transformation ratio of 5 gives 21½ volts on the secondary minus the 2½ volts secondary IR drop equals 19 volts.

Now considering the secondary winding 54, the transformation ratio is only 2½:1 for a 48 volt secondary. Accordingly the effective primary voltage of 107½ divided by 2½ equals 43 volts. Because this secondary winding 54 supplies only the radio circuit and not the relay 15A, the 10 or 20 milliampere drain is negligible and thus the entire 43 volts are available as a terminal voltage on winding 54. This is why during energization of the relay 15A, the voltage on the receiver 16 will be 43 minus 19 or 24 volts.

Figure 3:
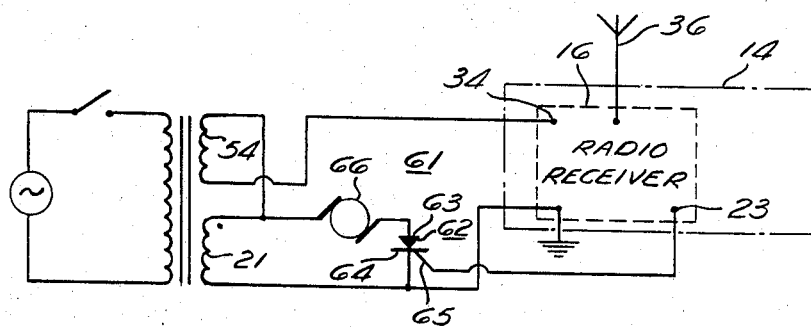

FIGURE 3 shows a circuit 61 similar to the circuit of FIGURES 1 and 2. The circuit 61 is quite similar to circuit 51 of FIGURE 2 except that a semiconductor controlled rectifier 62 replaces the relays 24 and 15 or 15A. This semiconductor controlled rectifier has an anode 63 and cathode 64 with conduction therethrough controlled by a gate 65. The controlled rectifier 62 is connected in series with a motor 66 across the secondary winding 21 as a second load on this circuit 61. The first load 14 is substantially continuously energized and upon receiving a signal the radio receiver 16 will have an output from the terminal 23 to cause conduction of the controlled rectifier 62. This will cause secondary winding 21 to have the large second load 66 supplied therefrom. When this large second load is supplied from secondary winding 21 the voltage to the input terminal 34 of radio receiver 16 is compensated because of the series opposing relationship of the secondary windings 21 and 54. In this sense the circuit 61 is similar to circuit 51. When only radio receiver 16 is being energized, secondary winding 21 has a first voltage, for example, 24 volts. When both loads 14 and 66 are being supplied secondary winding 21 has a second lower voltage, for example, 19 volts. When only the first load 14 is energized, the circuit element or secondary winding 54 has a third voltage, for example, 48 volts. When both first and second loads 14 and 66 are energized, the secondary winding 54 has a lower fourth voltage thereacross, for example 43 volts. The vector sum of the first and third voltage is substantially equal to the vector sum of the second and fourth voltages namely 48 minus 24 equals 43 minus 19.

Figure 4:
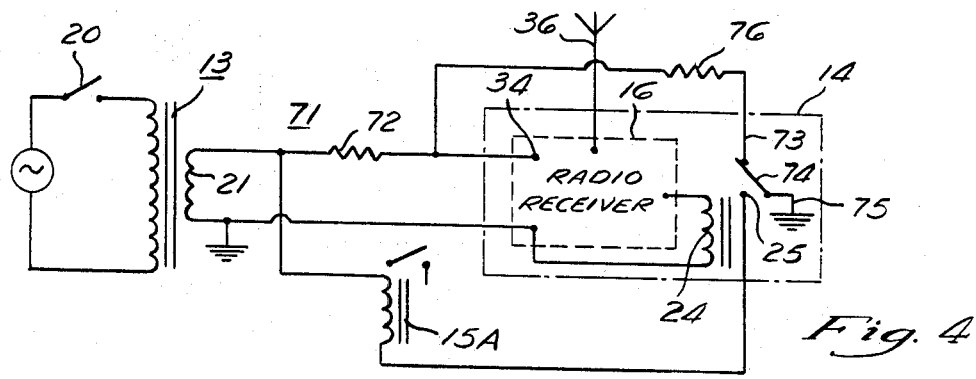

FIGURE 4 shows a circuit 71 showing a modified form of the invention. In this circuit secondary winding 21 of transformer 13 supplies the first load 14 through a first impedance or resistor 72. The power relay 15A is energized from secondary winding 21, through normally open contacts 25 on pilot relay 24. This pilot relay also has normally closed contacts 73 and the common blade 74 of the contacts 25 and 73 may be grounded at 75. Also these normally closed contacts 73 may be achieved by the grounded magnetic armature itself touching an insulated metal backstop. A second impedance or resistor 76 is connected through the normally closed contacts 73 to the input terminal 34 of the radio receiver 16.

With the switch 20 closed and the first load 14 only being energized, current is supplied from secondary winding 21 through resistor 72 to the receiver circuit 16. Current is also shunted to ground through resistor 72 and resistor 76 in series. This increases the voltage drop on the resistor 72. Assuming that the radio circuit 16 is designed to operate at 12 volts and 20 milliamperes then this means that the radio receiver 16 has an input impedance of 600 ohms. Then a 350 ohm impedance of the first resistor 72 and a second resistor 76 impedance of 840 ohms would provide proper operation. The resistor 76 is in parallel with the input to the receiver 16. The 600 and 840 ohm impedances in parallel are combined to make an impedance of 350 ohms at the terminal 24. Thus with only receiver 16 energized there is a 12 volt drop in resistor 72 to apply 12 volts to input terminal 34. Now when a signal is received on the antenna 36 the pilot relay 24 is energized to energize power relay 15A and apply a heavy load to secondary 21. This drops the terminal voltage of secondary winding 21 but at the same time the normally closed contacts 73 are opened. This eliminates the drain to ground through resistor 76. Now with 19 volts, for example, on secondary winding 21 there will be a seven volt drop through the resistor 72. Accordingly the resistor 72 acts as a circuit element establishing third and fourth voltages thereacross. The third voltage is 12 volts with only the receiver 16 energized and the fourth voltage is seven volts with both receiver 16 and load 15A energized. Accordingly 24 minus 12 equals 19 minus 7 to maintain a constant input voltage of 12 volts on the receiver 16.

Figure 5:
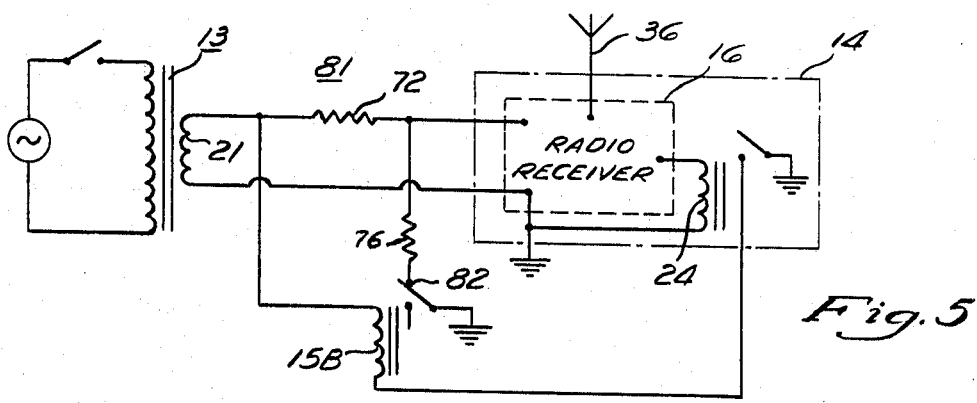

FIGURE 5 shows a circuit 81 similar to the circuit 71 of FIGURE 4. The resistors 72 and 76 are again used but in this case the normally closed contacts 82 are provided on the power relay 15B, rather than on the pilot relay 24. When a signal is received on antenna 36, the pilot relay 24 is energized to energize the power relay 15B. This opens the normally closed contacts 82 and eliminates the current drain to ground through resistor 76. Accordingly this reduces the voltage drop across resistor 72 from a third voltage to a fourth voltage. Again the first voltage of secondary 21 plus the vector sum of the third voltage across resistor 72 may be made by properly proportioning the circuit constants equal to the second voltage across secondary 21 plus the vector sum of the fourth voltage across resistor 72.

Figure 6:
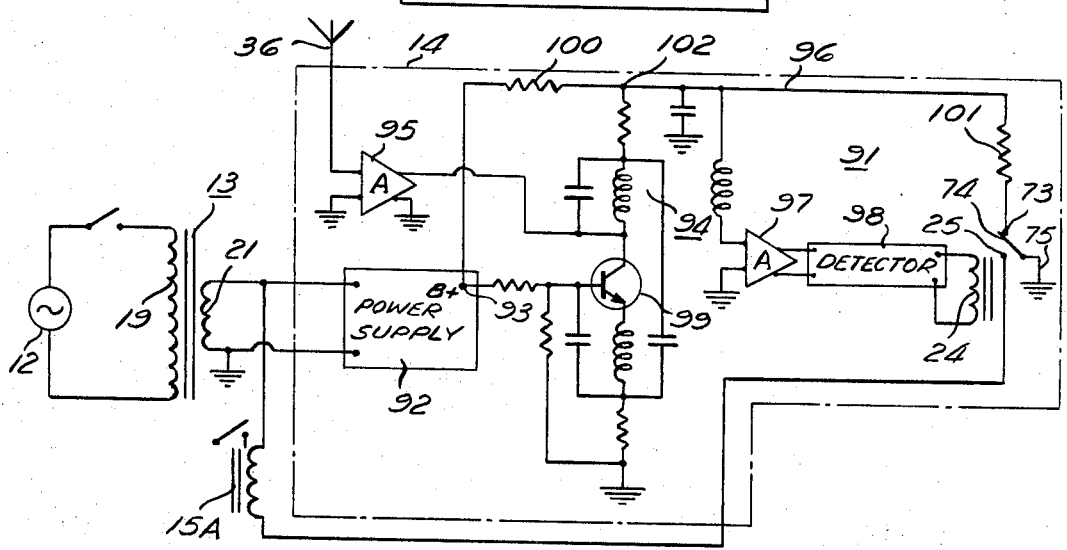

FIGURE 6 shows a circuit 91 similar to the circuits of FIGURES 4 and 5. In this case the transformer 13 has a secondary 21 which energizes a first load 94 which is only a portion of the radio receiver circuit 14. This secondary 21 also energizes the second load or relay 15A.

Within the radio receiver circuit 14 a power supply 92 is provided which may be an ordinary rectifier and filter circuit supplying a positive DC voltage at a terminal 93. This power supply 92 is energized directly from the secondary 21. This power supply 92 supplies power from its power supply terminal 93 to an RF amplifier which in turn supplies power to a superregenerative detector 94. This superregenerative detector 94 is the first load 94 on the transformer 13 on which it is desired to maintain a substantially constant input voltage. The detector stage 94 has an output on a conductor 96 to a quench frequency amplifier 97 and from there to a detector 98 the output of which is connected to operate the pilot relay 24. The pilot relay 24 has the normally open contact 25 and the normally closed contact 73 similar to the circuit of FIGURE 4.

The superregenerative detector stage 94 includes an amplifying device such as transistor 99. The power supply output terminal 93 supplies operating power to this superregenerative detector stage as well as to the other stages of the radio receiver circuit including amplifier stages 95 and 97 and detector stage 98. It has been found that the amplifier and detector stages 95, 97, and 98 are not voltage sensitive, but that the superrengerative stage 94 is that which is the first load on transformer 13 which is stabilized in input voltage. This superregenerative detector stage 94 includes a voltage dropping resistor 100 between the output terminal 93 of the power supply and an input terminal 102 of the stage 94. A resistor 101 is connected by conductor 96 between this terminal 102 and the normally closed contacts 73 of the pilot relay 24.

FIGURE 6 operates in a manner similar to the circuits of FIGURES 4 and 5. The radio receiver 14 receives an input voltage to the power supply 92 and through this power supply to each of the stages. The superregenerative stage 94 receives an operating voltage on terminal 102 which is dependent upon the current flow through resistor 100 and also the current flow through the resistor 101. Because resistor 101 is connected to ground 75 through the normally closed contacts 73, this shunts some current to ground and establishes a third voltage on terminal 102 when no signal is received on antenna 36. Also at this time a first voltage is developed on secondary 21. When a signal is received on antenna 36, then relays 24 and 15A are energized and relay 15A places a large temporary load on secondary winding 21 to lower the voltage thereof to a second voltage. However at this time, the normally closed contacts 73 open to relieve the current drain to ground through resistor 101. This therefore establishes a larger fourth voltage across the resistor 100. By proper proportioning of impedance values, as described above, the vector sum of the first and third voltages may be made equal to the vector sum of the second and fourth voltages.

The pilot relay 24 and power relay 15 of FIGURE 1, for example, may be considered amplifiers or amplifier means controlled by the output of the first load 14. Also it will be seen that these amplifiers or relays control a switch or switch means to control energization of the second load 15, 15A or 15B. Accordingly this shows the interdependence of energization of the first and second loads. Because the contacts on relays 24 and 15 may open or close and thus intermittently energize the ultimate load, the present invention shows that this contact chatter may be eliminated by maintaining the input voltage to the first load 14 substantially constant. In the circuit of FIGURE 3 the amplifier is the controlled rectifier 62 which is rendered selectively conductive. When this rectifier 62 is conducting it is equivalent to a switch being closed and the nonconducting condition of rectifier 62 is equilavent to the switch being opened.

The present disclosure includes that contained in the appended claims, as well as that of the foregoing description. Although this invention has been described in its preferred form with a certain degree of particularly, it is understood that the present disclosure of the preferred form has been made only by way of example and that numerous changes in the details of construction and the combination and arrangement of parts and steps may be resorted to without departing from the spirit and the scope of the invention as hereinafter claimed.

What is claimed is:

1. A circuit for supplying an input voltage to a first load, said circuit comprising, in combination, a transformer, primary winding means on said transformer energizable from a voltage source, secondary winding means on said transformer developing a first voltage under light load and a lower second voltage under a heavier load, circuit element means, switch means, a second load, means connecting said secondary winding means through said switch means to control energization of said second load, means receiving power from said transformer and developing a third voltage across said circuit element means when said second load is substantially deenergized and developing a fourth voltage across said circuit element means when said second load is substantially energized, and means connecting said secondary winding means through said circuit element means to energize the first load in accordance with the vector sum of the voltages thereacross.

2. A circuit as defined in claim 1 wherein the vector sum of said first and third voltages is substantially equal to the vector sum of said second and fourth voltages to maintain the input voltage to the first load substantially constant.

3. A circuit as defined in claim 1 wherein the first load is of considerably smaller amperage requirements than said second load.

4. A circuit as defined in claim 1 including an output from the first load, and means dependent upon the output of said first load to control said switch means.

5. A circuit as defined in claim 1 wherein said first load is a radio receiver adapted to receive a signal, said radio receiver upon receiving a signal establishing an output, means closing said switch means upon said radio receiver receiving a signal to energize said second load, said second load being of considerably larger amperage requirements than the first load to thus materially reduce the voltage if said secondary winding means, whereby the radio receiver would be inoperative and would terminate the output therefrom except for the the increased voltage supplied to the input of the radio receiver first load in accordance with the vector sum of said second and fourth voltages, such vector sum being sufficient to maintain the radio receiver operative to maintain an output therefrom.

6. A circuit as defined in claim 1 wherein said switch means is an amplifier or relay controlled by the output from the first load.

7. A circuit as defined in claim 1 wherein said switch means is an amplifier or relay controlled by the output from the first load, and the third voltage is developed across said circuit element means when said amplifier or relay has substantially no output and a fourth voltage is developed across said circuit element means when said amplifier or relay has an output.

8. A circuit as defined in claim 1 wherein the first load is substantially continuously supplied with energy and said second load is intermittently supplied, said second load requiring considerably more current than the first load, and said transformer being of a wattage rating to continuously supply the first load and to intermittently supply said second load.

9. A circuit as defined in claim 1 including a pilot relay and a power relay connected in cascade to control said switch means.

10. A circuit as defined in claim 1 including a radio receiver as the first load and a power relay as said second load.

11. A circuit as defined in claim 1 including an inductive winding as said circuit element means, and means receiving power from said transformer to develop a voltage across said inductive winding in one condition of the second load being energized or deenergized.

12. A circuit as defined in claim 1 including a second secondary winding on said transformer as said circuit element means.

13. A circuit as defined in claim 1 wherein said circuit element means is a secondary winding on a power relay, and said second load being said power relay.

14. A circuit as defined in claim 1 including an impedance as said circuit element means and developing a voltage drop thereacross to have the voltage thereacross subtractive from the voltage of the secondary winding means.

15. A circuit as defined in claim 1 including a pilot relay connected in cascade to a power relay to control said switch means, said first load being a radio receiver receiving a signal from a radio transmitter which establishes an output from the radio receiver to energize the pilot relay and to energize said power relay, and said power relay being said second load and thus decreasing the voltage across said secondary winding means.

16. A circuit as defined in claim 1 wherein said transformer has a core which is nonsaturable in normal use.

17. A circuit as defined in claim 1 including a portion only of a radio receiver as the first load and a power relay as said second load, an impedance as said circuit element means and developing a voltage drop thereacross to have the voltage thereacross substractive from the voltage of the secondary winding means, said impedance being connected in series with said portion of said radio receiver, and said switch means being connected to said impedance.

18. A circuit as defined in claim 1 including a relay as said second load, energizing winding on said relay, and a secondary winding on said relay acting as said circuit element means.

19. A circuit as defined in claim 1 including a relay as said second load, energizing winding on said relay, a secondary winding on said relay acting as said circuit element means, and said means to energize the first load includes a series connection of said secondary winding on said relay and said first load across said secondary winding means on said transformer with said windings in voltage additive relationship.

20. A circuit as defined in claim 1 including a relay having a core, said transformer having a core, and an inductive winding wound on one of said cores as said circuit element means.

21. A circuit as defined in claim 1 including a relay as said amplifier, contacts on said relay, and means connecting said contacts to control energization of said circuit element means.

22. A circuit as defined in claim 1 including a semiconductor controlled rectifier as said switch means.

and said second load being connected in series with said semi-conductor controlled rectifier to said secondary winding means.

23. A circuit as defined in claim 1 wherein said circuit element means is a second secondary winding on said transformer having a voltage approximately double that of the first secondary winding means, and the means to energize the first load includes a series connection of the first and second secondary winding means in voltage opposition.

24. A circuit as defined in claim 1 including a relay to control said switch means, and said circuit element means is a second secondary winding on said transformer.

25. A circuit as defined in claim 1 including a first impedance as said circuit element means.

said means to energize the first load including the series connection of said impedance and the first load to said secondary winding means, a relay controlling said switch means, said relay having normally closed contacts with the relay deenergized, a second impedance, means connecting said first and second impedances in series with said normally closed contacts across said secondary winding means to establish said third voltage across the first impedance as said circuit element means, said third voltage being higher than said fourth voltage whereby as the relay is energized, said normally closed contacts are opened and the current flow through said second impedance is terminated to develop the higher fourth voltage across said first impedance.

26. A circuit as defined in claim 1 including an impedance as said circuit element means, a pilot relay and a power relay in cascade, the first load being a radio receiver, and normally closed contacts mounted on said pilot relay to control current flow through said impedance.

27. A circuit as defined in claim 1 including a pilot relay and a power relay in cascade, the first load being a radio receiver, said circuit element means being an impedance, and normally closed contacts mounted on said pilot relay to control current flow through said impedance.

References Cited

UNITED STATES PATENTS

| 2,728,878 | 12/1955 | Sperr | 307—38 X |
| 3,094,690 | 6/1963 | Voorhees | 307—41 X |

ROBERT K. SCHAEFER, Primary Examiner

H. J. HOHAUSER, Assistant Examiner

U.S. Cl. X.R.

307—17